United States Patent
Hashimoto et al.

(10) Patent No.: US 6,578,363 B2
(45) Date of Patent: Jun. 17, 2003

(54) AIR-COOLED GAS TURBINE EXHAUST CASING

(75) Inventors: Yukihiro Hashimoto, Takasago (JP); Hironobu Hakoda, Takasago (JP); Kouichi Akagi, Takasago (JP); Rintaro Chikami, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/072,865

(22) Filed: Feb. 12, 2002

(65) Prior Publication Data

US 2002/0121082 A1 Sep. 5, 2002

(30) Foreign Application Priority Data

Mar. 5, 2001 (JP) ........................................ 2001-060476

(51) Int. Cl.⁷ ............................................... F02C 7/12
(52) U.S. Cl. ......................... 60/806; 415/115; 415/176
(58) Field of Search ..................... 60/39.5, 266, 806; 415/115, 116, 117, 176

(56) References Cited

U.S. PATENT DOCUMENTS

| 2,584,899 A | * | 2/1952 | McLeod | ..................... 415/115 |
| 3,015,937 A | * | 1/1962 | Giliberty | ..................... 60/806 |
| 4,815,272 A | * | 3/1989 | Laurello | ..................... 415/115 |
| 6,487,863 B1 | * | 12/2002 | Chen et al. | ..................... 60/806 |

FOREIGN PATENT DOCUMENTS

JP            6-173712         6/1994

* cited by examiner

*Primary Examiner*—Michael Koczo
(74) *Attorney, Agent, or Firm*—Oblon, Spivak, McClelland, Maier & Neustadt, P.C.

(57) ABSTRACT

Cooling air passages are formed in the wall of an exhaust casing connected to a turbine casing of a gas turbine. Low pressure air extracted from the low pressure stage of an air compressor of the gas turbine is supplied to the cooling air passage from the portion near the downstream end of the exhaust casing. Cooling air flows through the cooling air passage toward the upstream end of the exhaust casing and then flows into an annular cavity formed in the turbine casing near the portion corresponding to the last turbine stage. Therefore, the metal temperature of the exhaust casing near the upstream end (near the joint between the exhaust casing and the turbine casing) is lowered by the cooling air and, as cooling air of a relatively high temperature is supplied to the cavity in the turbine casing, the metal temperature of the turbine casing near the downstream end becomes higher than that provided by a conventional cooling system. Therefore, the difference between the metal temperatures of the turbine casing and the exhaust casing becomes very small and the thermal stress exerted on the exhaust casing due to the temperature difference can be largely reduced.

2 Claims, 2 Drawing Sheets

AIR-COOLED GAS TURBINE EXHAUST CASING

FIELD OF THE INVENTION

The present invention relates to a combustion gas turbine and, specifically, it relates to an air-cooled exhaust casing of a gas turbine provided with cooling air passages in the wall of the casing.

DESCRIPTION OF THE RELATED ART

In a gas turbine, a mixture of a high-pressure combustion air and fuel are burned in combustors in order to generate high-pressure and high-temperature combustion gas. This combustion gas is supplied to a plurality of turbine stages, each comprising stator blades and rotor blades and disposed in a turbine casing, in order to convert the energy of the combustion gas into the rotational energy of the rotor blades. The combustion gas, the pressure thereof being lowered after passing the turbine stages, passes through a diffuser disposed in an exhaust casing in order to recover its pressure before it is discharged to the atmosphere.

Usually, the stator blades of the respective turbine stages are fixed to a stator ring disposed in the turbine casing. A predetermined amount of gap is maintained between the outer surface of the stator ring and the inner wall of the turbine casing so that an annular cavity is formed between each of the stator rings and the inner wall of the turbine casing.

Cooling air is supplied from the gas turbine air compressor into the annular cavities between the stator rings and the turbine casing to prevent the stator rings and the turbine casing wall from being excessively heated by high-temperature combustion gas passing through the respective turbine stages.

The annular cavities between the stator rings and the turbine casing wall are arranged in the axial direction and are separated from each other by diaphragms. Cooling air supplied to each annular cavity enters cooling air passages formed in the stator blades through the stator ring and, after cooling the stator blades, discharged into the combustion air passages to thereby mix with combustion gas.

The exhaust casing is connected to the downstream end of the turbine casing and, as the combustion gas flows into the exhaust casing after expanding at the respective turbine stages, the temperature of the exhaust gas flowing into the exhaust casing is relatively low. Further, since a diffuser is disposed in the exhaust casing and the inner wall of the exhaust casing is shielded from the exhaust gas by the diffuser, the temperature of the exhaust casing wall is substantially lower than that of the turbine casing wall. Therefore, no cooling facility is provided in the exhaust casing wall.

However, it has been found that the conventional cooling system of the turbine casing as explained above, in which cooling air is supplied to the annular cavities for cooling the casing and stator blades, sometimes causes problems such as a damage or a distortion of the exhaust casing connected to the turbine casing, or a distortion of the stator rings.

As explained above, cooling air supplied to the annular cavities of the respective turbine stages is discharged into the combustion gas passing through the respective turbine stages after cooling the stator rings and the stator blades of the respective stages. Therefore, the pressure of cooling air supplied to the cavities must be higher in the upstream turbine stages. Usually, cooling air is extracted from the gas turbine air compressor discharge or from the intermediate stages of the compressor. Since the pressure requirement for the cooling air is different in the respective cavities, cooling air supplied to the cavities of upstream stages, for example, is taken from the discharge or high-pressure stages of the gas turbine air compressor.

Similarly, cooling air for the cavities of the intermediate turbine stage is extracted from intermediate-pressure stage of the compressor and cooling air for the cavities of the downstream turbine stages is taken extracted from low-pressure stages of the compressor.

The temperature of the air extracted from the compressor stages becomes higher as the pressure of the extracted air becomes higher. Therefore, when the air extracted from the gas turbine compressor is used for cooling air, the temperature of the cooling air supplied to the upstream turbine stages becomes higher than the temperature of the cooling air supplied to the downstream turbine stages and, at the most downstream (last) turbine stage, i.e., at the turbine stage nearest to the joint where the exhaust casing is connected, the cooling air supply temperature becomes the lowest. This causes the wall temperature of the turbine casing near the exhaust casing joint to be considerably lower than the combustion gas (exhaust gas) temperature.

On the other hand, no cooling facility is provided on the exhaust casing. Therefore, though the wall of the exhaust casing is shielded from the hot exhaust gas by the diffuser disposed in the exhaust casing, the metal temperature of the exhaust casing approaches that of the exhaust gas due to the radiation from the diffuser.

Therefore, when an air cooling system of the turbine casing is used, the metal temperature of the turbine casing wall becomes relatively low although the metal temperature of the exhaust casing wall becomes relatively high. Therefore, a large temperature difference occurs between the turbine casing and the exhaust casing at the joint portion therebetween. This large temperature difference generates a relatively large thermal stress in the exhaust casing. In general, the exhaust casing has a sufficient rigidity to withstand such a thermal stress and the thermal stress does not cause immediate damage. However, when the gas turbine is operated for a long period in the condition where the exhaust casing is subject to a large thermal stress, damage such as cracking due to a low cycle fatigue, or a deformation, may occur in the exhaust casing.

Further, the stator rings are disposed in the annular cavities in order to hold the turbine stator blade. In the last turbine stage, the outer side (the cavity side) of the stator ring is cooled by the low temperature cooling air and the inner side (the hot gas side) of the stator ring contact with the hot exhaust gas, thereby the temperature difference across the stator ring in the radial direction becomes very large in the last turbine stage. Therefore, a large thermal stress is generated in the stator ring of the last turbine stage due to the temperature difference and, in some extreme case, a damage or distortion of the stator ring occurs due to the large thermal stress.

SUMMARY OF THE INVENTION

In view of the problems in the related art as set forth above, the object of the present invention is to provide an air-cooling system for a gas turbine casings capable of preventing generation of a large thermal stress on the exhaust casing and turbine stator rings.

According to the present invention, there is provided an air-cooled gas turbine exhaust casing containing an exhaust diffuser and connected to a turbine casing having turbine stages each including turbine stator blades and rotor blades, the exhaust casing being provided with cooling air passages disposed within the casing wall and extending in the axial direction, wherein the cooling air passages include cooling air inlets disposed near the downstream end of the exhaust casing, cooling air outlets disposed near the upstream end of the exhaust casing and connected to an annular cavity formed between a stator ring holding the stator blades of the last turbine stage and the inner surface of the turbine casing wall, whereby cooling air enters into the cooling air passages at the portion near the downstream end of the exhaust casing, flows within the exhaust casing wall toward the upstream end of the exhaust casing and enters the annular cavity of the last turbine stage from the downstream end of the turbine casing.

According to the present invention, cooling air is supplied to the cooling air passages of the exhaust casing from the portion near the downstream end of the exhaust casing. This cooling air passes through the cooling air passages in the exhaust casing wall toward the upstream end of the exhaust casing. Further, the cooling air after passing through the cooling air passages in the exhaust casing is supplied to the annular cavity of the last turbine stage from the upstream end of the exhaust casing.

Thus, the temperature of the exhaust casing wall near the connection to the turbine casing becomes lower than that of the conventional non-cooled exhaust casing. Further, since cooling air is supplied to the annular cavity of the last turbine stage after being warmed in the cooling air passage of the exhaust casing, the wall temperature of the turbine casing at the portion of the last turbine stage (i.e., the portion near the joint to the exhaust casing) becomes higher than that of the conventional case. Therefore, the temperature difference between the turbine casing and the exhaust casing, as well as the resultant thermal stress in the exhaust casing, becomes very small in the present invention.

Further, as the temperature of the cavity side of the stator ring becomes higher than the conventional case in the present invention, the temperature difference between the cavity side and the hot gas side of the stator ring is also reduced. Thus, according to the present invention, the thermal stress exerted on the stator ring is largely reduced.

In the present invention, although the exhaust casing is air-cooled in addition to the turbine casing, it is possible to suppress the increase in the consumption of the cooling air. In the conventional cooling system, pressurized air extracted from an intermediate compressor stage of the gas turbine air compressor is used as cooling air supplied to the annular cavity of the last turbine stage. Therefore, if the same air, i.e., air extracted from the intermediate compressor stage is supplied to the cooling air passage of the exhaust casing, the additional air-cooling of the exhaust casing can be carried out without increasing the cooling air consumption in the present invention. Thus, according to the present invention, the temperature difference and the resultant thermal stress in the exhaust casing can be reduced without increasing the cooling air consumption that deteriorates the thermal efficiency of the gas turbine.

BRIEF DESCRIPTION OF THE DRAWINGS

The present invention will be better understood from the description, as set forth hereinafter, with reference to the accompanying drawings in which:

FIGS. 1A and 1B are drawings explaining an embodiment of the present invention in which FIG. 1B shows a longitudinal section view of the turbine casing and the exhaust casing and, FIG. 1A shows wall temperatures of the respective parts of the casings in FIG. 1B; and FIGS. 2A and 2B are the drawings similar to FIGS. 1A and 1B, respectively, in which FIG. 2B shows the longitudinal section view of the conventional turbine casing and exhaust casing and, FIG. 2A shows the wall temperatures of the respective parts of the casings in FIG. 2B.

DESCRIPTION OF THE PREFERRED EMBODIMENT

Hereinafter, embodiments of an air-cooled gas turbine exhaust casing according to the present invention will be explained with reference to FIGS. 1A and 1B.

Figure 1A:
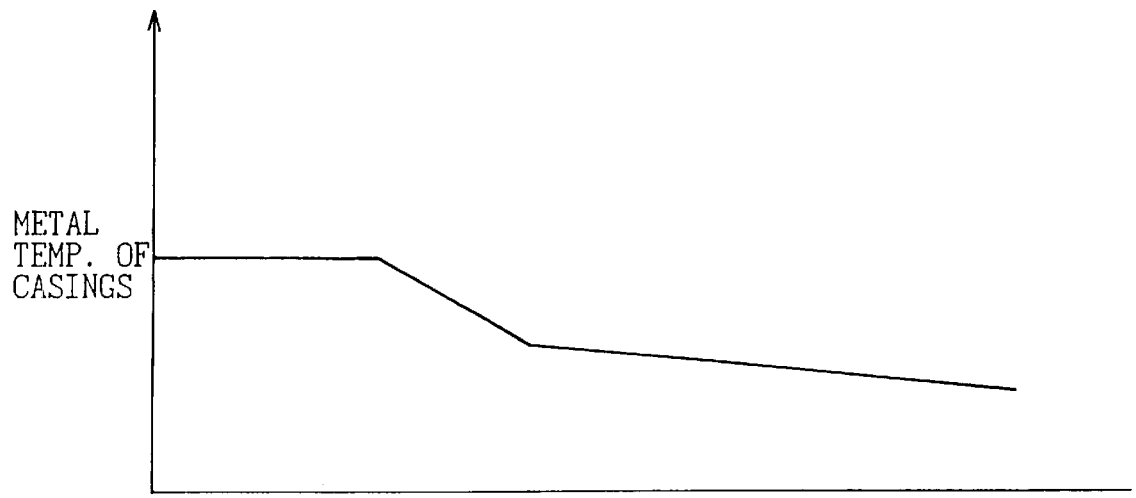
Figure 1B:
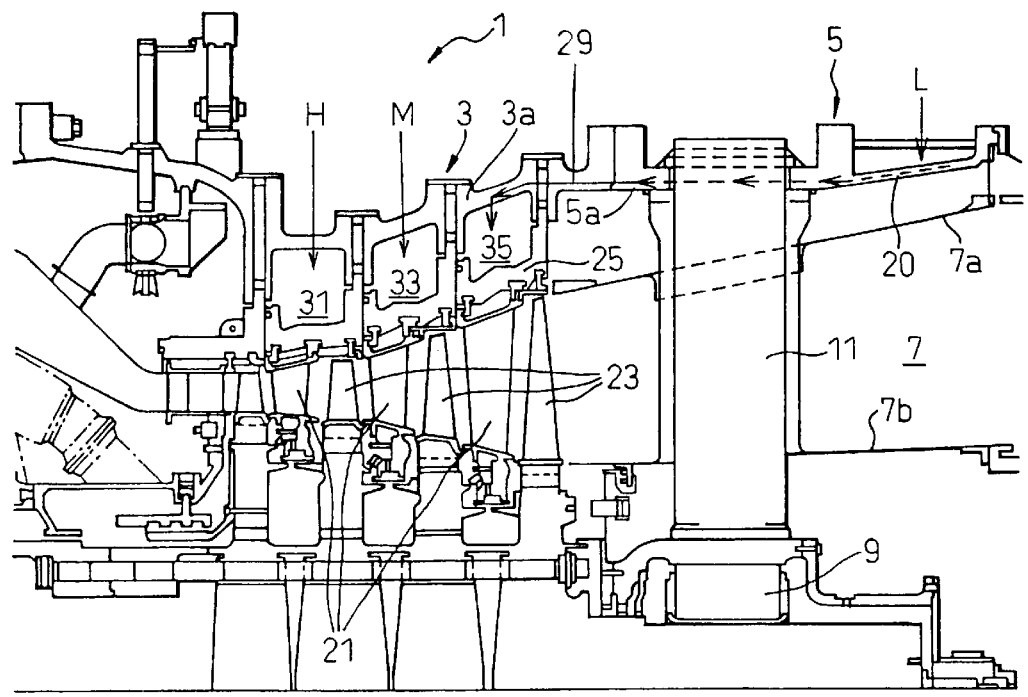

FIG. 1B is a longitudinal section view of the gas turbine showing the general construction of the turbine casing and the air-cooled exhaust casing according to an embodiment of the present invention.

In FIG. 1B, numeral 1 denotes a gas turbine as a whole, 3 denotes a turbine casing of the gas turbine 1 and 5 denotes an exhaust casing connected to the turbine casing 3 at the downstream side thereof with respect to the exhaust flow direction.

Numerals 21 and 23 in FIG. 1B designate turbine stator blades and turbine rotor blades, respectively. Stator blades 21 and the rotor blades 23 form a turbine stage and, the stator blades 23 of the respective turbine stages are fixed to stator rings 25 disposed within the turbine casing 3 so that the outer peripheries of the stator rings 25 oppose the wall 3a of the turbine casing 3 with a predetermined distance therebetween. The space between the outer peripheries of the stator rings 25 and the inner periphery of the wall 3a is divided to axial sections corresponding to the respective turbine stages. Thus, annular cavities are formed in the turbine casing at the portions corresponding to the respective turbine stages (in FIG. 1B shows the case where three annular cavities 31, 33 and 35 are formed).

In the exhaust casing 5, an exhaust diffuser 7 which forms a passage of exhaust gas from the last turbine stage is disposed. The diffuser 7 consists of a cylindrical inner casing 7b and a cone shaped outer casing 7a, both made of thin metal plate. An annular exhaust gas passage diverging towards the downstream direction is formed between the outer casing 7a and the inner casing 7b of the diffuser 7. Exhaust gas from the last turbine stage passes through the annular exhaust gas passage and recovers its static pressure before it flows into an exhaust gas duct connected to the downstream end of the exhaust casing 5.

The outer casing 7a of the diffuser 7 is held at a predetermined distance from the wall 5a of the exhaust casing 5 so that an annular clearance is formed between the exhaust casing 5 and the outer casing 7a of the diffuser 7. A journal bearing 9 for supporting the turbine rotor, to which the rotor blades 23 are fixed, is contained in the inner casing 7b of the diffuser 7. The upstream end of the exhaust casing 5 is connected to the downstream end of the turbine casing 3 by fastening bolts disposed around the periphery of the exhaust casing 5. Numeral 11 in FIG. 1B is a strut which penetrates the exhaust casing 5. The strut 11 is formed as a hollow duct having an oblong circular cross section and used as a passage for piping such as lubricating oil pipes to and from the bearing 9 in the inner casing 7a of the diffuser 7.

In this embodiment, a plurality of cooling air passages 20 extending in the axial direction are formed within the wall 5a of the exhaust casing 5. The cooling air passages 20 are disposed around the exhaust casing 5 at regular circumferential intervals. The respective cooling air passages 20 have cooling air inlets at the portion near the downstream end of the exhaust casing 5 where the respective cooling air passages 20 are connected to cooling air supply external pipes (not shown in the drawing).

The respective cooling air passages 20 have cooling air outlets at the upstream end of the exhaust casing 5. The respective cooling outlets of the cooling air passages 20 of the exhaust casing 5 are connected to cooling air passages 29 formed within the turbine casing wall 3a at regular circumferential intervals. The cooling air passages 29 communicate with the annular cavity 35 to thereby connect the cooling air passages 20 of the exhaust casing 5 to the annular cavity 35 of the turbine casing 3.

Separate cooling air pipes (not shown in the drawing) are connected to the annular cavity 31 of the upstream turbine stage and the annular cavity 33 of the intermediate turbine stage in order to supply cooling air to the cavities 31 and 33 separately.

In this embodiment, high pressure air H extracted from a discharge or a high-pressure stage of a gas turbine air compressor (not shown) is supplied to the upstream turbine stage annular cavity 31 as cooling air, and intermediate pressure air M extracted from an intermediate-pressure stage of the gas turbine air compressor is supplied to the intermediate turbine stage annular cavity 35 as cooling air. Further, low pressure air L extracted from a low-pressure stage of a gas turbine air compressor is supplied to the cooling air passages 20 of the exhaust casing 5. Cooling air supplied to the respective cavities 31, 33, 35 flows into the stator blades 23 of the respective stages from cooling air inlets disposed on the stator rings 25 of the respective stages and cools the stator blades 23 as it flows through cooling air passages formed within the respective stator blades 23. After cooling the respective stator blades 23, cooling air is discharged from the cooling air outlets on the side faces of the respective stator blades into the combustion gas passing through the respective turbine stages.

Next, the difference between the exhaust casing 5 in the present embodiment and the conventional exhaust casing will be explained.

Figure 2A:
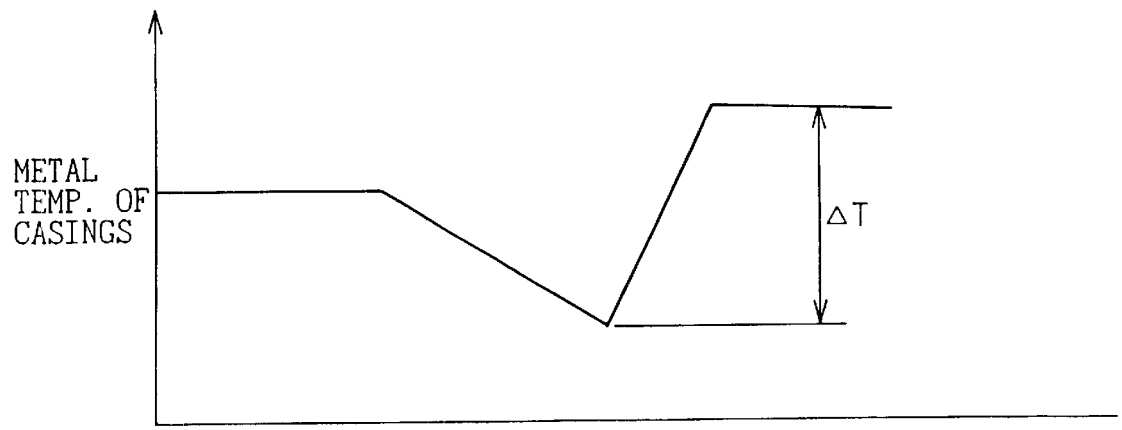
Figure 2B:
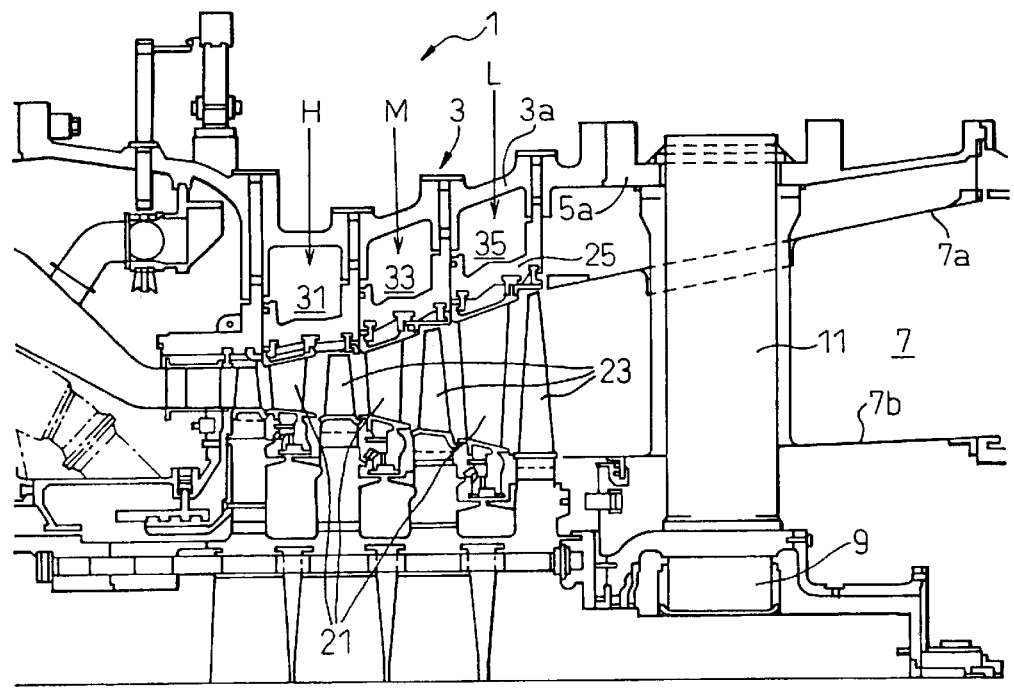

FIG. 2B is a longitudinal section view of a gas turbine similar to FIG. 1B and showing a general construction of a conventional turbine casing and exhaust casing. In FIG. 2B, reference numerals the same as those in FIG. 1B denote elements similar to those in FIG. 1B.

As can be seen from FIG. 2B, no cooling air passage is provided on the exhaust casing in the conventional construction, i.e., the conventional exhaust casing is not cooled. Further, in the conventional construction, low pressure cooling air L is supplied to the annular cavity 35 of the last turbine stage directly by a separate cooling air supply pipe (not shown).

In the conventional construction in FIG. 2B, cooling air supplied to the upstream turbine stage cavity 31 and intermediate turbine stage cavity 33 are extracted from the high-pressure stage and the intermediate-pressure stage of the air compressor, respectively. Therefore, the temperature of the cooling air supplied to these cavities 31 and 33 is relatively high and corresponds to its pressure. For example, the temperatures of the cooling air supplied to the upstream stage cavity 31 and the intermediate stage cavity 33 are about 600° K. and 550° K., respectively.

On the other hand, as the cooling air supplied to the last stage cavity 35 is low pressure air extracted from the low-pressure stage of the air compressor in the conventional construction and the temperature thereof is a low value of around 400° K.

FIG. 2A shows temperatures of the walls 3a and 5a (metal temperatures) of the respective parts of the turbine casing 3 and exhaust casing 5 in FIG. 2B.

As can be seen from FIG. 2A, the metal temperature of the wall 3a of the turbine casing 3 decreases towards downstream end thereof due to the difference in the temperature of the cooling air supplied to the cavities, and becomes considerably lower than exhaust gas temperature near the last stage cavity 35 in the conventional construction in FIG. 2B.

However, as the exhaust casing is not cooled in the conventional construction, the wall 5a of the exhaust casing 5 is heated by the radiation from the exhaust gas passing through the diffuser 7 and the metal temperature thereof approaches the exhaust gas temperature (about 850° K., for example). Thus, a large temperature difference between the metal temperatures of the casing walls occurs near the joint between the turbine casing 3 and the exhaust casing 5 (ΔT in FIG. 2A). This temperature difference causes a steep temperature gradient along the exhaust gas flow direction in the exhaust casing 5 as shown in FIG. 2A. Thus, a relatively large thermal stress is caused by this steep temperature gradient and, in some cases, cracking of the exhaust casing wall 5a due to a low cycle fatigue, or distortion of the exhaust casing 5 due to the thermal stress, occur after a long period of operation. In addition, the service life of the stator ring 25 of the last turbine stage is also shortened, in some cases, due to the thermal stress exerted on the stator ring 25 as explained before.

In contrast, exhaust casing 5 of the present embodiment in FIG. 1B is cooled by air entering the cooling air passages 20 from the inlet disposed near the downstream end of the exhaust casing 5 and flowing toward the upstream end through the wall 5a of the exhaust casing 5. Due to the air cooling, the metal temperature of the exhaust casing wall 5a near the upstream end thereof in the present invention becomes lower than that of the conventional construction.

After cooling the exhaust casing wall 5a, the cooling air, after being heated to a relatively high temperature (around 500° K., for example), is supplied from the cooling air passages 20 to the cavity 35 of the last turbine stage through the cooling air passages 29 in the turbine casing wall 3a. Since the temperature of the cooling air supplied to the cavity 35 is higher than that in the conventional construction, the metal temperature of the turbine casing wall 3a near the downstream end thereof becomes higher than that in the conventional construction.

FIG. 1A shows the metal temperature distribution of the turbine casing and the exhaust casing in the present embodiment. As can be seen from FIG. 1A, the metal temperature of the exhaust casing 5 decreases and the metal temperature of the turbine casing 3 increases, respectively, near the joint between the exhaust casing 5 and the turbine casing 3 compared with the conventional construction. Thus, the temperature difference between the exhaust casing 5 and the turbine casing 3 near the joint portion becomes very small, and the metal temperature gradually decreases from the downstream end of the turbine casing 3 toward the downstream end of the exhaust casing 5 in the present embodiment. It can be clearly seen from FIG. 1A that the steep gradient in the metal temperature of the casings in the conventional construction (FIG. 2A) is eliminated in the present embodiment. Therefore, as the thermal stress exerted on the exhaust casing 5 becomes much smaller in the present embodiment, the damage or distortion of the exhaust casing 5 does not occur even after a long period of operation of the gas turbine.

Further, the temperature of the cooling air supplied to the cavity 35 is high (500° K., for example) in the present embodiment and the difference in the temperature across the stator ring 25 is largely reduced comparing with that in the conventional construction. Therefore, the thermal stress exerted on the stator ring 25 is reduced and, thereby, the service life of the stator ring is prolonged in the present embodiment.

In the present embodiment, the amount of cooling air supplied to the cooling air passages 20 of the exhaust casing 5 is substantially the same as the amount of cooling air directly supplied to the cavity 35 in the conventional construction in FIG. 2B. Therefore, the overall consumption of cooling air, which largely affects the thermal efficiency of the gas turbine, is substantially the same as that in the conventional construction.

Therefore, according to the present invention, the reduction of the thermal stress exerted on the exhaust casing and the stator ring of the last turbine stage can be achieved without involving deterioration of the thermal efficiency of the gas turbine.

What is claimed is:

1. An air-cooled gas turbine exhaust casing containing an exhaust diffuser and connected to a turbine casing having turbine stages each including turbine stator blades and rotor blades, the exhaust casing being provided with cooling air passages disposed within the casing wall and extending in the axial direction, wherein the cooling air passages include:

cooling air inlets disposed near the downstream end of the exhaust casing, cooling air outlets disposed near the upstream end of the exhaust casing and connected to an annular cavity formed between a stator ring holding the stator blades of the last turbine stage and the inner surface of the turbine casing wall, whereby cooling air enters into the cooling air passages at the portion near the downstream end of the exhaust casing, flows within the exhaust casing wall toward the upstream end of the exhaust casing and enters the annular cavity of the last turbine stage from the downstream end of the turbine casing.

2. An air-cooled gas turbine exhaust casing as set forth in claim 1, wherein cooling air is extracted from an intermediate stage of an air compressor of the gas turbine and supplied to the air inlets of the cooling air passages and, after entering into the annular cavity of the last turbine stage from the cooling air passages, the cooling air is discharged from the annular cavity into the combustion gas passing the last turbine stage through air passages formed within the stator blades of the last turbine stage.

* * * * *